United States Patent
Toshinaga et al.

(10) Patent No.: US 10,788,782 B2
(45) Date of Patent: Sep. 29, 2020

(54) IMAGE FORMING APPARATUS LOCKS DOWN STORAGE AREA OF CACHE MEMORY STORES PORTION OF IMAGE FORMING PROGRAM FOR EXECUTING REAL-TIME IMAGE FORMING PROCESS

(71) Applicant: KONICA MINOLTA, INC., Chiyoda-ku, Tokyo (JP)

(72) Inventors: Yuji Toshinaga, Toyokawa (JP); Shigeki Nozawa, Gifu (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 435 days.

(21) Appl. No.: 15/651,468

(22) Filed: Jul. 17, 2017

(65) Prior Publication Data
US 2018/0024491 A1 Jan. 25, 2018

(30) Foreign Application Priority Data
Jul. 20, 2016 (JP) .................. 2016-142545

(51) Int. Cl.
*H04N 1/00* (2006.01)
*G03G 15/00* (2006.01)
(Continued)

(52) U.S. Cl.
CPC ......... *G03G 15/70* (2013.01); *G03G 15/5087* (2013.01); *G06F 12/0888* (2013.01);
(Continued)

(58) Field of Classification Search
None
See application file for complete search history.

(56) References Cited

U.S. PATENT DOCUMENTS

2007/0076255 A1* 4/2007 Hamashima .......... G06F 3/1204
358/1.16
2008/0162822 A1* 7/2008 Okuyama ........... G06F 12/0866
711/134
(Continued)

FOREIGN PATENT DOCUMENTS

JP 04-239944 A 8/1992
JP 5-73420 A 3/1993
(Continued)

OTHER PUBLICATIONS

Office Action (Notice of Reasons for Refusal) dated Jan. 28, 2020, by the Japanese Patent Office in corresponding Japanese Patent Application No. 2016-142545, and an English Translation of the Office Action. (8 pages).

*Primary Examiner* — Benny Q Tieu
*Assistant Examiner* — Haris Sabah
(74) *Attorney, Agent, or Firm* — Buchanan Ingersoll & Rooney PC

(57) ABSTRACT

An image forming device that executes an image forming program for real-time mechanical control and another program, using a single cache memory for the image forming program and said another program. The image forming device includes: a cache lockdown unit that executes a cache lockdown to lock down a storage area of the cache memory that stores at least a portion of the image forming program necessary for image formation processing; and a print unit that executes the image formation processing while the storage area is locked down.

20 Claims, 12 Drawing Sheets

(51) Int. Cl.
*G06F 12/0888* (2016.01)
*H04N 1/32* (2006.01)

(52) U.S. Cl.
CPC ..... *H04N 1/00915* (2013.01); *H04N 1/00917* (2013.01); *H04N 1/3263* (2013.01); *H04N 1/32443* (2013.01); *G06F 2212/1024* (2013.01); *G06F 2212/172* (2013.01); *H04N 1/00485* (2013.01); *H04N 1/00856* (2013.01); *H04N 1/00962* (2013.01); *H04N 2201/0094* (2013.01); *H04N 2201/3297* (2013.01)

(56) References Cited

U.S. PATENT DOCUMENTS

| | | | |
|---|---|---|---|
| 2008/0273218 A1* | 11/2008 | Kitora | G06K 9/00463 358/1.13 |
| 2010/0241833 A1 | 9/2010 | Suzue | |
| 2013/0247049 A1 | 9/2013 | Aoki et al. | |
| 2015/0286574 A1 | 10/2015 | Endou | |
| 2016/0179681 A1* | 6/2016 | Greenspan | G06F 12/0864 711/128 |

FOREIGN PATENT DOCUMENTS

| | | |
|---|---|---|
| JP | 6-19797 A | 1/1994 |
| JP | 2000-250518 A | 9/2000 |
| JP | 2010-79765 A | 4/2010 |
| JP | 2010-0226283 A | 10/2010 |
| JP | 2013-190950 A | 9/2013 |
| JP | 2015-200947 A | 11/2015 |

\* cited by examiner

Single-core configuration

Double-core configuration

IMAGE FORMING APPARATUS LOCKS DOWN STORAGE AREA OF CACHE MEMORY STORES PORTION OF IMAGE FORMING PROGRAM FOR EXECUTING REAL-TIME IMAGE FORMING PROCESS

This application is based on an application No. 2016-142545 filed in Japan, the contents of which are hereby incorporated by reference.

BACKGROUND OF THE INVENTION

(1) Field of the Invention

The present invention relates to image forming devices, and in particular to techniques for ensuring real-time performance when cache memory is shared between real-time processing and best-effort processing.

(2) Related Art

Conventionally, a dedicated central processing unit (CPU) for executing best-effort processing such as image processing and graphical user interface (GUI) processing, and a dedicated CPU for executing real-time processing such as mechanical control at a time of image formation are installed in an image forming device.

In recent years, general-purpose CPUs for embedded systems have become more sophisticated, and along with a demand for cost reduction, image forming devices that perform both best-effort processing and real-time processing by using a single CPU are being proposed.

Further, in order to execute best-effort processing and real-time processing at high speed, it is effective to use a cache memory that can access small volumes at high speed.

However, if cache memory is shared between real-time processing and best-effort processing, there is a risk of cache data of real-time processing being cached out by best-effort processing, harming real-time performance of mechanical control. For example, if a start of driving of a transport roller downstream in a paper transport direction is delayed, there is a possibility that paper is pressed against the stopped transport roller, causing a paper jam.

In response to such problems, for example, providing a high-speed memory dedicated to real-time processing may be considered (cf. JP 2000-250518). According to such a configuration, access conflict to cache memory is avoided and high-speed access to memory is always possible, so real-time processing is ensured.

However, an increase in parts cost cannot be avoided if a high-speed memory is used, and the merit of using a single CPU is reduced.

SUMMARY OF THE INVENTION

An object of the present invention is to provide an image forming device capable of ensuring real-time processing while a cache memory is shared between real-time processing and best-effort processing.

In order to achieve this object, the image forming device pertaining to the present invention is an image forming device that executes an image forming program for real-time mechanical control and another program, using a single cache memory for the image forming program and said another program, the image forming device comprising: a cache lockdown unit that executes a cache lockdown to lock down a storage area of the cache memory that stores at least a portion of the image forming program necessary for image formation processing; and a print unit that executes the image formation processing while the storage area is locked down.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings.

DESCRIPTION OF EMBODIMENTS

Embodiments of an image forming device pertaining to the present invention are described below with reference to the drawings.

[1] Embodiment 1

An image forming device pertaining to Embodiment 1 of the present invention makes it impossible for an image forming program stored in cache memory to cache out, by using a cache lockdown function when executing image formation processing, thereby ensuring real-time performance of mechanical control.

(1-1) Image Forming Device Configuration

First, configuration of an image forming device pertaining to the present embodiment is described.

Figure 1:
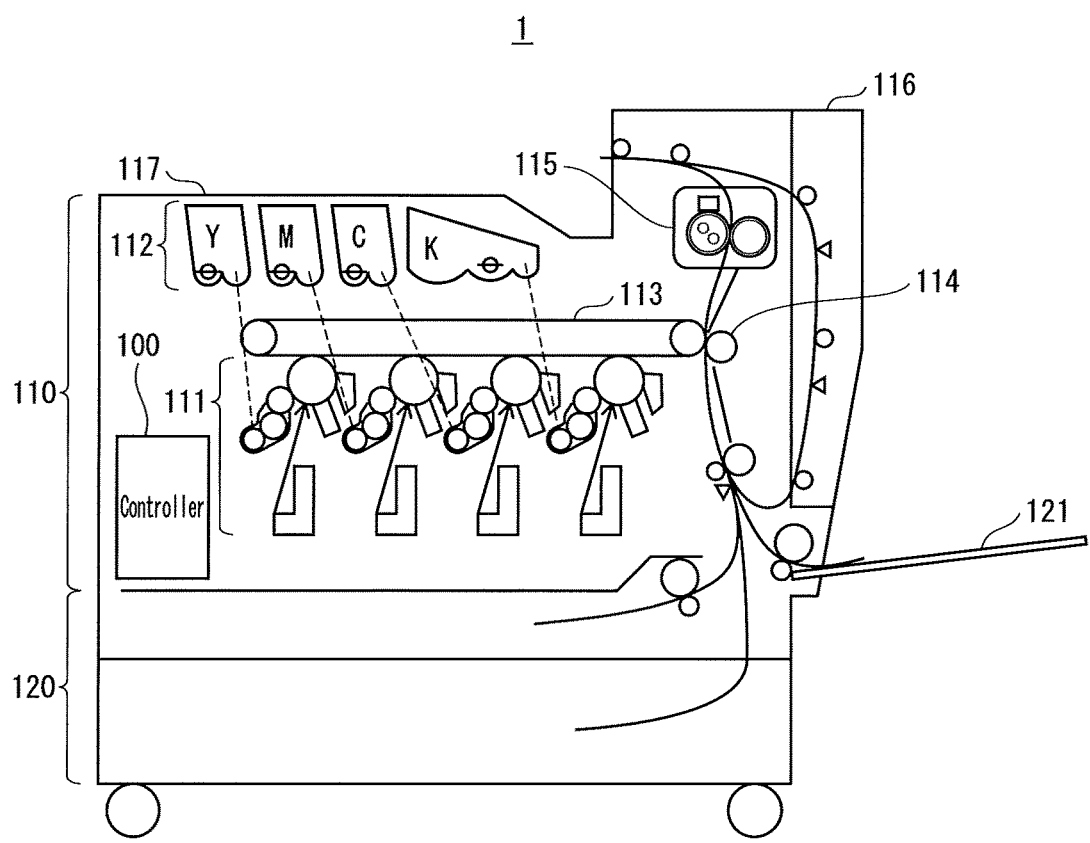
FIG. 1 shows configuration of an image forming device pertaining to Embodiment 1 of the present invention.

As shown in FIG. 1, an image forming device 1 pertaining to the present embodiment is a tandem-type color printer. The image forming device 1 includes an image forming section 110 and a paper feed section 120. The image forming section 110 has an imaging unit 111. The imaging unit 111 receives a supply of yellow, magenta, cyan, and black toner from toner bottles 112 to form corresponding toner images, then transfers each color of toner image onto an intermediate transfer belt 113 so they are superimposed, thereby forming a color toner image.

In order for each color of toner image to be superimposed on the intermediate transfer belt 113, each color of toner image must be formed and transferred at a time differences matched to a rotational travel speed of the intermediate transfer belt 113.

The intermediate transfer belt 113 conveys a color toner image to a secondary transfer roller pair 114. In parallel, the paper feed section 120 supplies, one by one, paper stored in a paper cassette. After a color toner image is transferred from the intermediate transfer belt 113 to a sheet at a secondary transfer nip of the secondary transfer roller pair 114, the color toner image is heat fixed by a fixing device 115.

In the case of duplex printing, the sheet is guided to a duplexing unit 116, a toner image is transferred to a back surface of the sheet, and the toner image is heat fixed. Subsequently, the sheet is discharged onto a discharge tray 117. Note that instead of paper from a paper cassette, paper stacked on a manual feed tray 121 may be used. Further, the image forming section 110 incorporates a controller 100, and the controller 100 controls operations of the image forming device 1.

(1-2) Controller 100 Configuration

The following describes configuration of the controller 100.

Figure 2:
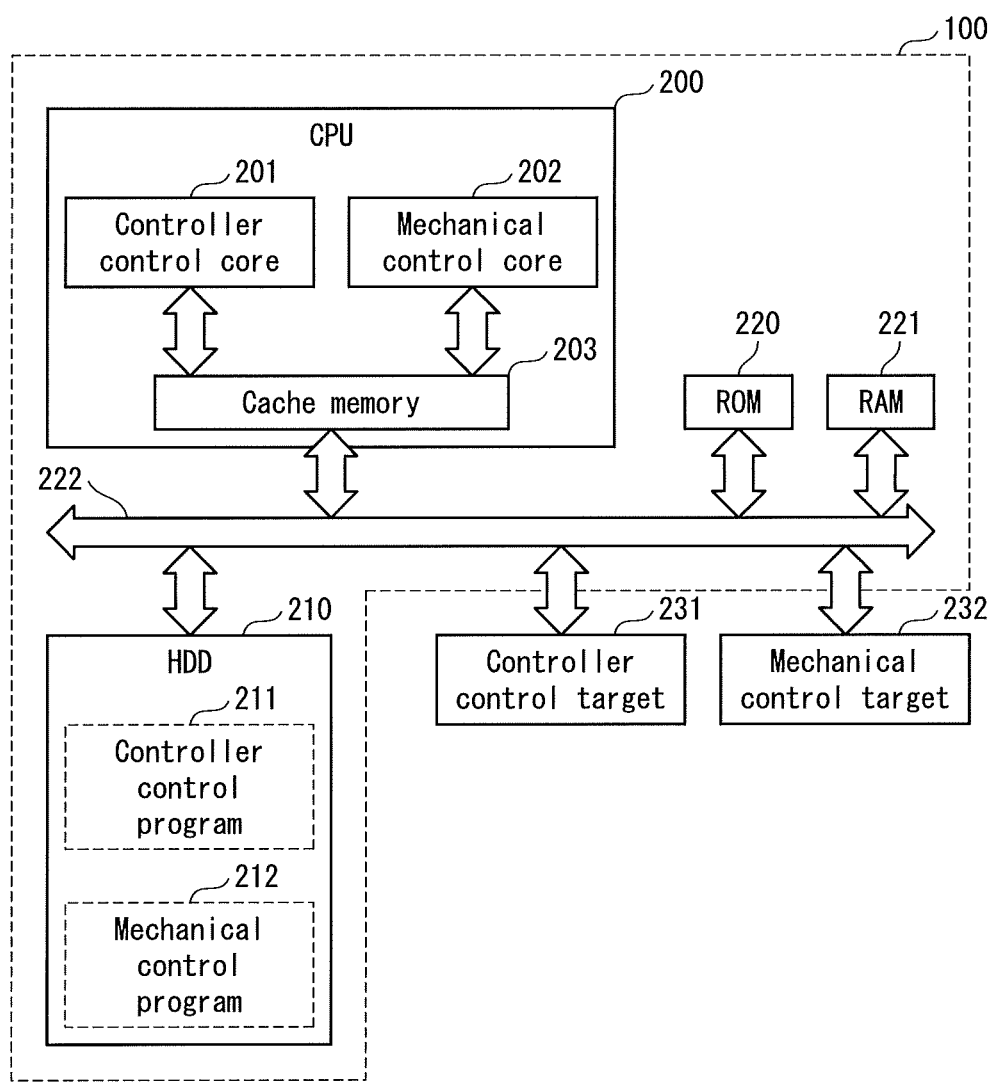
FIG. 2 shows configuration of controller 100.

As shown in FIG. 2, the controller 100 includes a CPU 200 and a hard disk drive (HDD) 210. The CPU 200 is a multi-core processor and includes two cores 201, 202 and a cache memory 203. According to the present embodiment, the core 201 performs controller control and the core 202 performs mechanical control.

Here, the term "controller control" refers to control of image processing and control of the entire image forming device 1, and more specifically to control of image processing such as acquisition of image data and bitmap development, control of network communication to communicate with a personal computer (PC) or other device, control of an operation panel for receiving instructions from a user, and the like. Controller control is a best-effort type of processing performed as fast as possible for large amounts of data processing such as image processing and network processing, and response to user operations.

Further, the term "mechanical control" refers to mechanical control of the image forming device 1 in order to execute an image forming process specified by controller control, and more specifically to mechanical control such as conveying a printing medium, controlling a semiconductor laser, or temperature adjustment. Mechanical control is directly related to quality of printed images and high real-time performance is required.

The cores 201, 202, share the cache memory 203, a read only memory (ROM) 220, a random access memory (RAM) 221, and the HDD 210. A boot program for booting the CPU 200 when the image forming device 1 is turned on is stored in the ROM 220. The RAM 221 is used as a work storage area of the CPU 200. The HDD 210 stores a controller control program 211 and a mechanical control program 212.

The controller control core 201 reads the controller control program 211 from the HDD 210 and controls a controller control target 231 while using the RAM 221 as a work storage area. The controller control target 231 is, for example, an image processing circuit, a network device, an operation panel, or the like. Further, the controller control core 201 instructs the mechanical control core 202 to execute image formation processing.

The mechanical control core 202 reads the mechanical control program 212 from the HDD 210 and controls the mechanical control target 232 while using the RAM 221 as a work storage area. The mechanical control target 232 is, for example, a motor clutch, a sensor, or the like.

The CPU 200 has a cache lockdown function. The term "cache lockdown function" refers to a function of prohibiting updating of addresses registered in the cache memory 203 and continuing caching access to already registered addresses.

Typically, a CPU operates by accessing programs and data in a main memory. At such time, data in the main memory that is automatically accessed again and again by hardware is loaded into a small capacity high-speed memory, called a cache, and the next time access to the same address is made to the cache, memory access is performed faster ("cache hit"). However, a cache has a smaller capacity than a main memory, and therefore when access to the main memory is repeated, space in the cache runs out.

When there is no more space in the cache, and access to a new address is made, the oldest data is expelled from the cache ("cache out"). A subsequent access of data that was cached out does not cache hit, and is therefore not performed faster. Cache lockdown prohibits caching out of data stored in a portion or all of a cache. When a cache lockdown is performed, specified data is not cached out and faster access to said data is ensured.

Further, the CPU 200, the HDD 210, the ROM 220, the RAM 221, the controller control target 231, and the mechanical control target 232 are connected by an internal bus 222 so as to allow communication with each other. The CPU 200 also arbitrates access to the internal bus 222.

(1-3) Image Formation Processing

The following describes image formation processing pertaining to the present embodiment.

(1-3-1) Controller Control Core 201 Image Formation Processing

First, image formation processing of the controller control core 201 is described.

Figure 3:
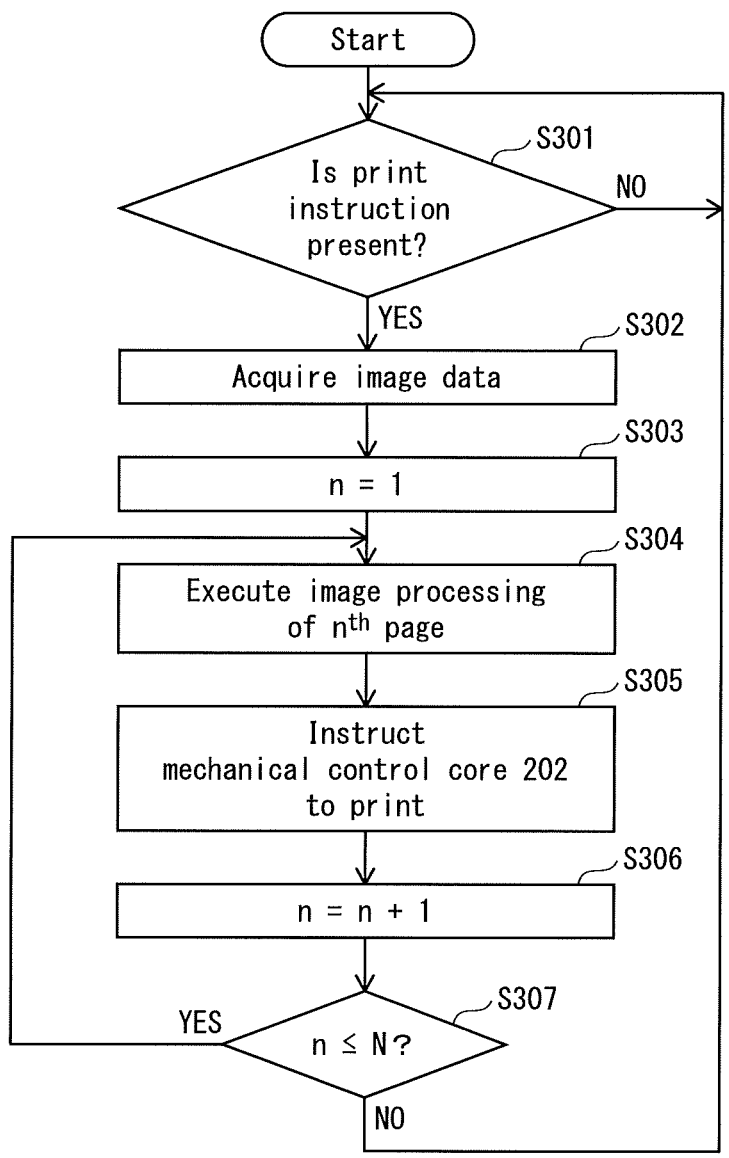
FIG. 3 is a flowchart representing image formation processing of controller control core 201.

Image formation processing starts when the controller control core 201 receives a print instruction. That is, as shown in FIG. 3, upon receiving a print instruction (S301: YES), the controller control core 201 acquires image data (S302). A print instruction is received from a user via use of an operation panel or received from another device such as a personal computer (PC) via a network.

Further, when receiving a print instruction, location information of image data is received in order to acquire the image data, and the image data itself is received. For example, image data may be acquired from a PC, and in a case in which the image forming device 1 includes a scanner, image data read by the scanner from a document may be acquired.

Next, an operating variable n representing a page number of image data pertaining to the print instruction is initialized to 1 (S303). Note that a total page count of image data is represented by N. Next, image processing such as bitmap development is applied to image data of an nth page (S304), image data after the image processing is designated, and the mechanical control core 202 is instructed to print (S305).

Next, value of the working variable n is incremented by 1 (S306), and as long as the working variable n is less than or equal to the total page count N (S307: NO), processing proceeds to step S304 and image processing is executed for the next page. When the working variable n is greater than the total page count N (S307: YES), processing proceeds to wait for the next print instruction.

(1-3-2) Mechanical Control Core 202 Processing

The following describes processing of the mechanical control core 202.

(1-3-2-1) Main Routine

A main routine of image formation processing executed by the mechanical control core 202 is started according to a print instruction of the controller control core 201.

Figure 4:
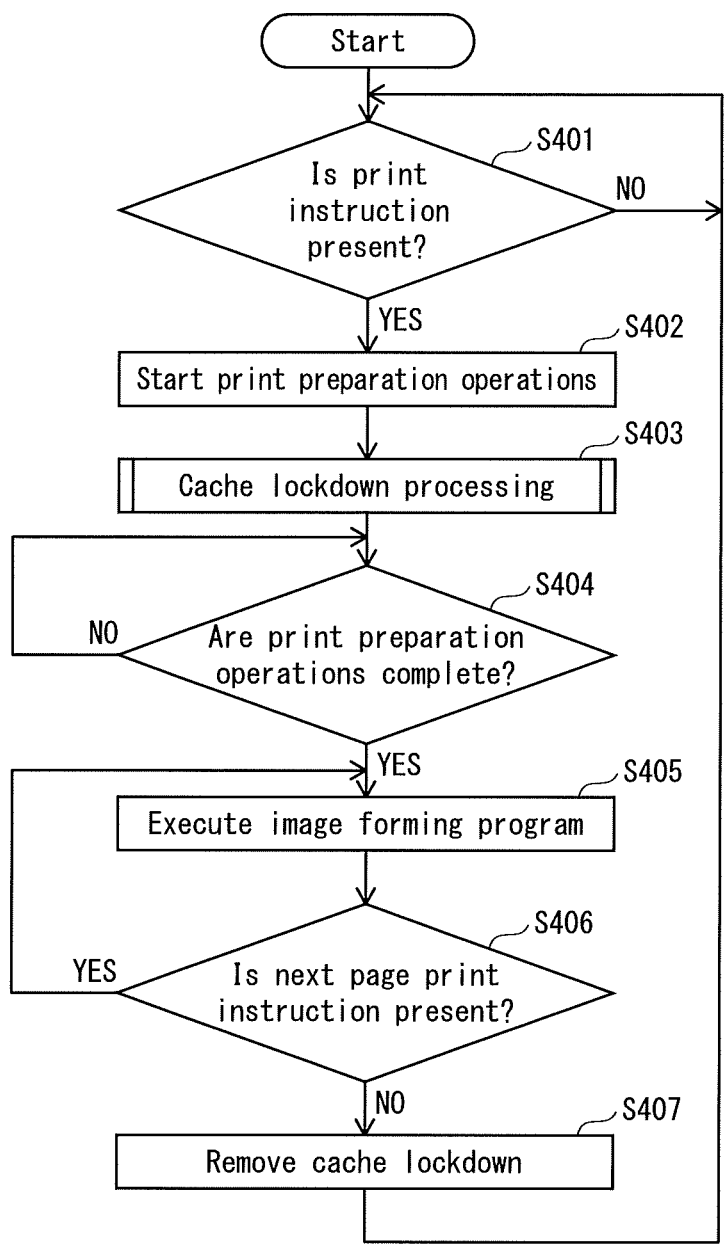
FIG. 4 is a flowchart representing a main routine of image formation processing of mechanical control core 202.

As shown in FIG. 4, upon receiving a print instruction from the controller control core 201 (S401: YES), the mechanical control core 202 starts print preparation operations such as a warm up operation of the fixing device 115 (S402). Next, cache lockdown processing is executed (S403). The cache lockdown processing, as described later, is processing that prohibits new cache data from being written to the cache memory 203 in a state in which an image forming program is stored.

According to the present embodiment, cache lockdown processing is executed during print preparation operations, and therefore a delay in starting image formation processing due to execution of cache lockdown processing is prevented.

Subsequently, if print preparation operation is complete (S404: YES), the mechanical control core 202 executes image formation processing for one page (S405). In image formation processing for one page, paper supply from the paper feed section 120, formation of a toner image by charging, exposure, and development taking place at photoreceptors in the imaging unit 111, transfer of a toner image to paper, heat fixing of a toner image to paper, and discharge of paper to the discharge tray 117 takes place.

After starting image formation processing of one page, upon receiving a print instruction for a next page (S406: YES), processing proceeds to step S405 and image formation processing is executed for the next page. Note that the image formation process of the next page may start after completion of the image formation process of the previous page, and, where possible, the image formation process of the next page can start before completion of the image formation process of the previous page.

In a case in which a print instruction for a next page is not received (S406: NO), the cache lockdown is removed (S407), processing proceeds to step S401, and the above processing is repeated.

(1-3-2-2) Cache Lockdown Processing

Next, cache lockdown processing is described.

Figure 5:
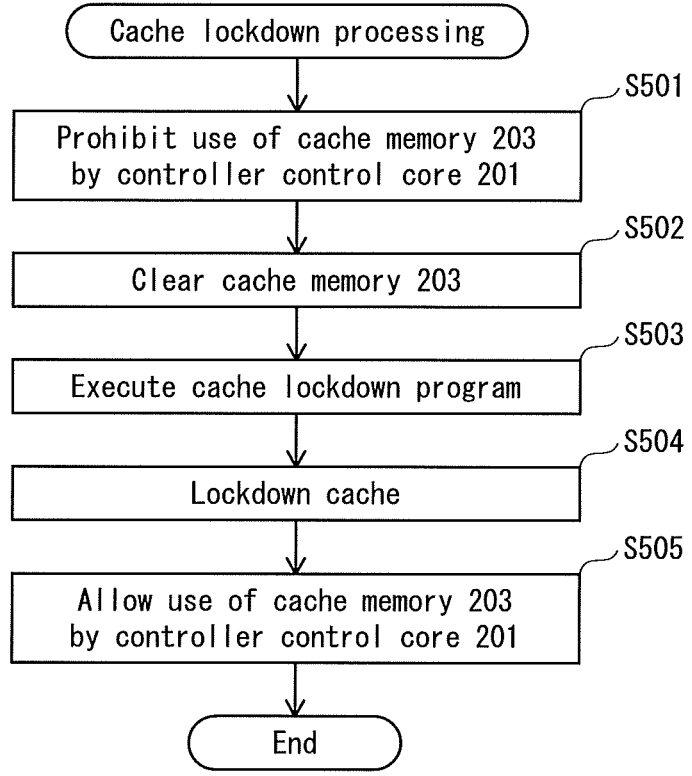
FIG. 5 is a flowchart representing cache lockdown processing.

In cache lockdown processing, as shown in FIG. 5, the mechanical control core 202 prohibits use of the cache memory 203 by the controller control core 201 (S501). Thus, cache data updating by the controller control core 201 is stopped, and therefore cache data pertaining to the mechanical control core 202 is not cached out, and access to the cache memory 203 is ensured.

Next, the mechanical control core 202 clears the cache memory 203 (S502). In this case, first, cleaning processing is executed to write cache data that is not reflected in the RAM 221 to the RAM 221, then the cache memory 203 is flushed, and all cache lines are invalidated. Note that processing to clear the cache memory 203 may be omitted.

Next, the mechanical control core 202 executes a cache lockdown program (S503). The cache lockdown program is a part of the image forming program other than motor control, sensor control, and timing processing. By execution of the cache lockdown program, execution of the image forming program is simulated.

Figure 6:
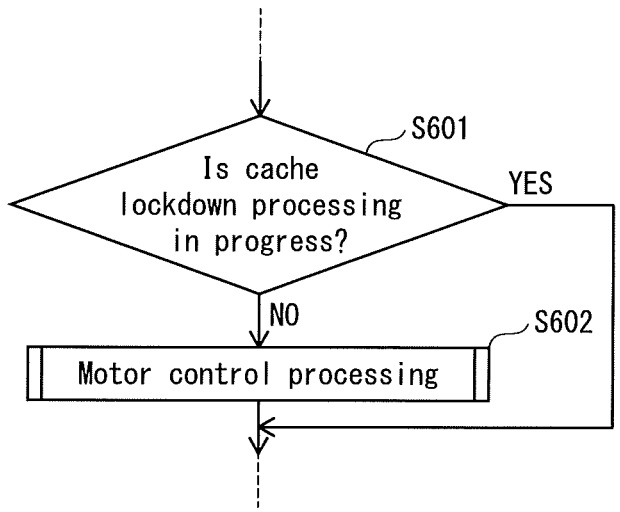
FIG. 6 is a flowchart illustrating a process in which a cache lockdown program bypasses code such as motor control.

According to the present embodiment, as shown in FIG. 6, during cache lockdown processing (S601: YES), the image forming program, as a cache lockdown program, bypasses code such as motor control and proceeds to subsequent code. Further, during actual execution of the image formation processing (S601: NO), the image forming program executes motor control normally (S602).

Thus, in cache lockdown processing, it is possible to prevent a motor and sensor from operating in the same way as in actual execution of the image formation processing, and to avoid taking as much time as actual execution.

When the cache lockdown program is executed, a print mode included in a print instruction of the controller control core 201 is referred to. The print mode indicates, for example, paper size, color mode, paper type, and the like. Thus, code executed in the image formation processing of the image forming program is executed as the cache lockdown program and stored in the cache memory 203.

When the cache lockdown program refers to a detection value of each sensor provided to a part of the image forming device 1, it is desirable to simulate the detection value of the sensor in order that the cache lockdown program can operate normally. Further, it is preferable that a simulated value is a value corresponding to the print mode included in the print instruction.

Upon completion of the cache lockdown program, the mechanical control core 202 locks down the cache (S504), and permits the controller control core 201 to use the cache memory 203 (S505). Thus, speed of processing of the controller control core 201 is increased.

Thus, the image forming program is not cached out during image formation processing, and therefore real-time performance can be ensured. Further, when image formation processing is not being executed, the controller control core 201 is permitted to use the cache memory 203, and therefore speed of processing of the controller control core 201 is increased.

[2] Embodiment 2

The following describes Embodiment 2 of the present invention.

While the image forming device pertaining to the present embodiment includes essentially the same configuration as the image forming device pertaining to Embodiment 1, processing of the mechanical control core 202 is different. The following focuses on describing differences. In the present description, members common to the embodiments are assigned the same reference signs.

The main routine of the mechanical control core 202 is described below.

Figure 7:
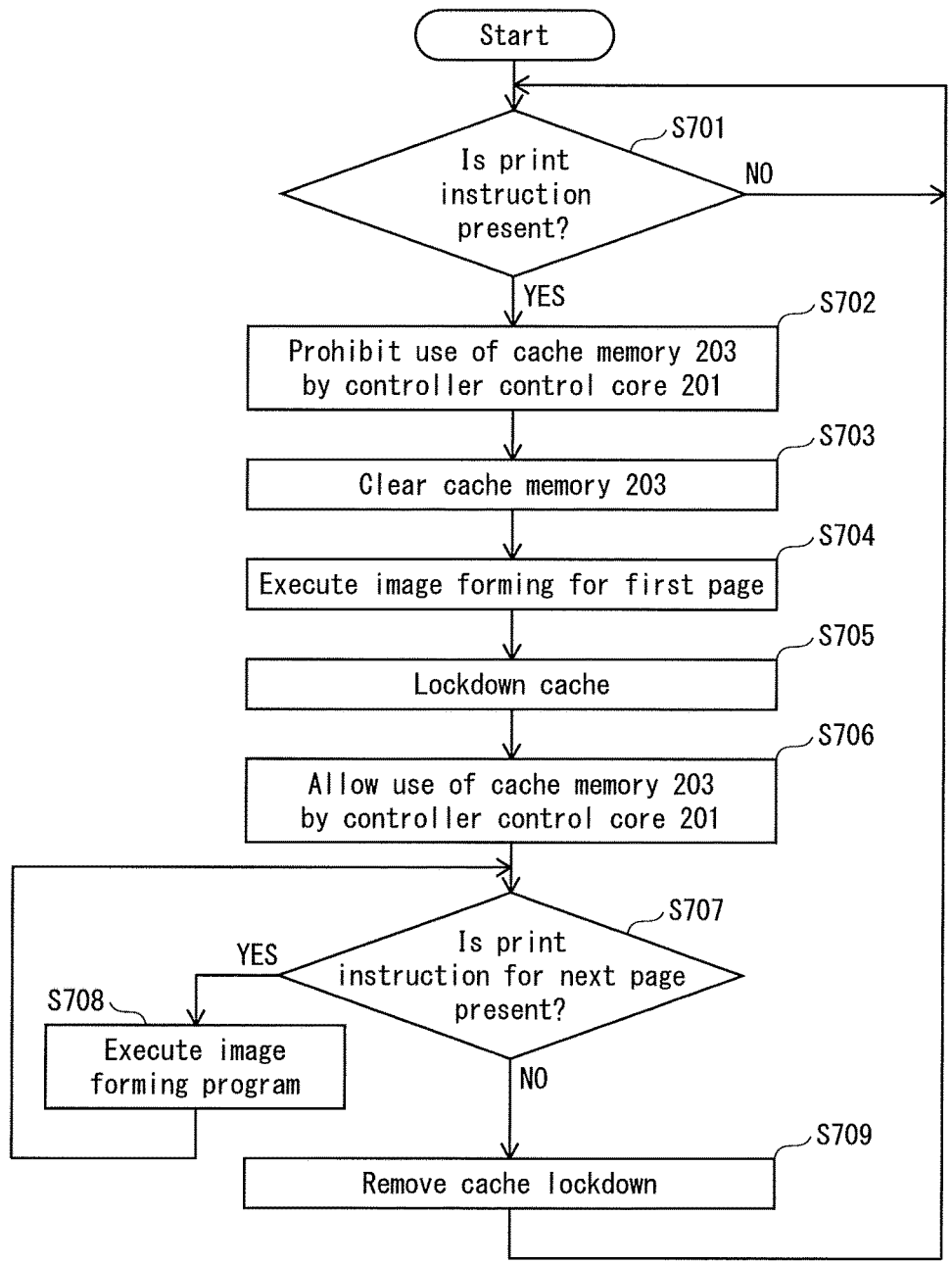
FIG. 7 is a flowchart representing a main routine of image formation processing of mechanical control core 202 pertaining to Embodiment 2 of the present invention.

As shown in FIG. 7, upon receiving a print instruction from the controller control core 201 while in a state of completed print preparation operations (S701: YES), the mechanical control core 202 prohibits use of the cache memory 203 by the controller control core 201 (S702) and clears the cache memory 203 (S703).

Next, image formation processing is executed for a first page (S704), and when image formation processing of the first page is completed, cache lockdown is performed (S705). Thus, cache lockdown can be performed in a state in which code of the image forming program executed according to a print mode is stored in the cache memory 203. Subsequently, use of the cache memory 203 by the controller control core 201 is permitted (S706).

If a print instruction for a next page is received from the controller control core 202 (S707: YES), the image formation processing for the next page is executed (S708). In a case in which a print instruction for a next page is not received (S707: NO), the cache lockdown is removed (S709), and processing proceeds to step S701.

When a user of the image forming device 1 operates an operation panel, or the image forming device 1 includes a scanner and a user opens or closes a document cover of the scanner, the image formation processing is started immediately thereafter, without requiring the user to issue a print instruction, in order that print preparation operations can be performed automatically. Thus, first copy out time (FCOT) can be decreased, which is efficient.

However, as in Embodiment 1, in a case in which the cache lockdown program is executed during print preparation operations after receiving a print instruction, and print preparation operations are already complete or soon completed, FCOT is extended by the execution time of the cache lockdown program. Thus, the effect of an early start of print preparation operations is reduced.

In contrast, if the image forming program is stored in the cache memory 203 by executing image formation processing of a first page, as in the present embodiment, extension of FCOT can be prevented.

[3] Embodiment 3

The following describes Embodiment 3 of the present invention.

While the image forming device pertaining to the present embodiment includes essentially the same configuration as the image forming device pertaining to Embodiment 1, processing of the mechanical control core 202 when a jam occurs during actual job processing is different. The following focuses on describing differences. In the present description, members common to the embodiments are assigned the same reference signs.

A main routine of the mechanical control core 202 is described, and in particular processing after print preparation operations are complete.

Figure 8:
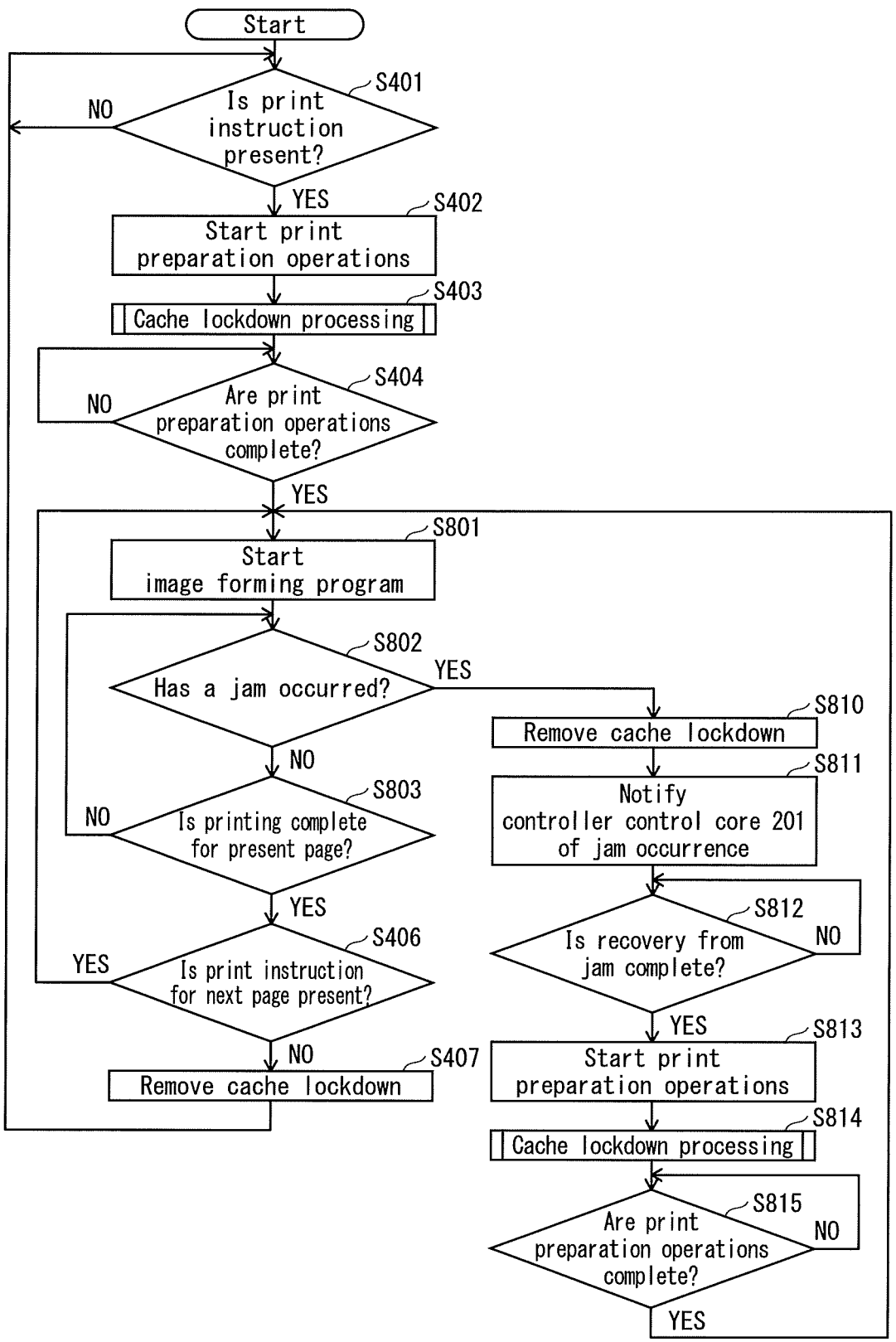
FIG. 8 is a flowchart representing a main routine of image formation processing of mechanical control core 202 pertaining to Embodiment 3 of the present invention.

As shown in FIG. 8, when print preparation operations are complete (S404: YES), the mechanical control core 202 starts the image forming program (S801). When a jam occurs during image formation processing (S802: YES), cache lockdown is removed (S810) and the controller control core 201 is notified of the jam occurrence (S811).

The controller control core 201, upon receiving notification of the jam, notifies a user of the jam via the operation panel. In addition, an alarm may be sounded. Subsequently, after recovery from a jam according to removal of jammed paper from the image forming device 1 by a user (S812: YES), the mechanical control core 202 starts print preparation operations (S813), and executes cache lockdown processing (S814).

When print preparation operations are complete (S815: YES), processing proceeds to step S801 and image formation processing is repeated for the present page. When a jam does not occur (S802: NO), and image formation processing of the present page is complete (S803: YES), whether or not a print instruction for a next page is received is checked. If a print instruction for a next page is received (S406: YES), the image formation processing for the next page is started (S801). In a case in which a print instruction for a next page is not received (S406: NO), the cache lockdown is removed (S407), processing proceeds to step S401, and processing waits for a subsequent print instruction.

Thus, the controller control core 201 can use the cache memory 203 during jam processing, and therefore processing speed of the controller control core 201 can be increased.

When a jam occurs, the mechanical control core 202 may cancel all print instructions received from the controller control core 201 at once. In such a case, the mechanical control core 202, after recovery from a jam (S812: YES), returns to step S401 and re-receives print instruction from the controller control core 201.

In this way, it is possible to determine which page to print or what printing to cancel after a jam occurs according to instruction from a user, and therefore a more flexible response is possible for the user.

[4] Modifications

The above description is based on embodiments of the present invention, but the present invention is of course not limited to the embodiments described above, and the following modifications may be implemented.

(4-1) According to Embodiment 1, an example is described of the mechanical control core 202 prohibiting use of the cache memory 203 by the controller control core 201, but the present invention is of course not limited to this example and alternatives are described below.

For example, the mechanical control core 202 interrupts the controller control core 201, thereby stopping processing of the controller control core 201 while executing cache lockdown processing, thereby preventing caching out of the image formation processing.

Figure 9:
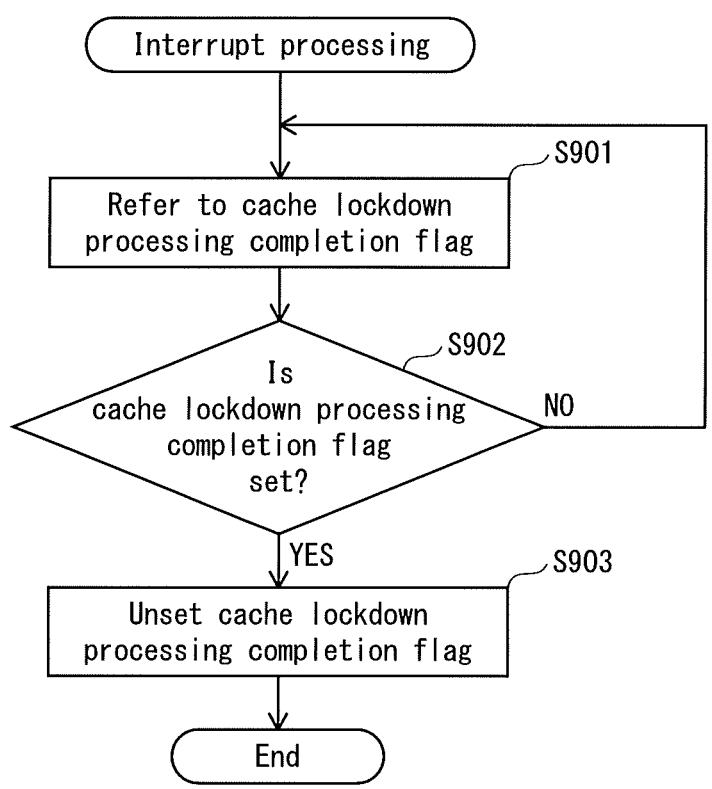
FIG. 9 is a flowchart showing interrupt processing executed by controller control core 201 when an interrupt is received from mechanical control core 202 pertaining to a modification of the present invention.

FIG. 9 is a flowchart showing interrupt processing executed by the controller control core 201 when an interrupt is received from the mechanical control core 202. As shown in FIG. 9, upon receiving an interrupt from the mechanical control core 202, the controller control core 201 references a predefined address of the RAM 221 to check whether a cache lockdown processing completion flag is set (S901).

If the cache lockdown processing completion flag is not set (S902: NO), processing proceeds to step S901 and the cache lockdown processing completion flag is again monitored. If the cache lockdown processing completion flag is set (S902: YES), the cache lockdown processing completion flag is unset (S903) and interrupt processing ends.

Thus, while the mechanical control core 202 is executing the cache lockdown processing, the controller control core 201 executes only the interrupt processing, so only the interrupt processing program is stored in the cache memory 203. Accordingly, it is possible to prevent data stored in the cache memory 203, and in particular the image forming program, from being cached out during the cache lockdown processing of the mechanical control core 202.

Figure 10:
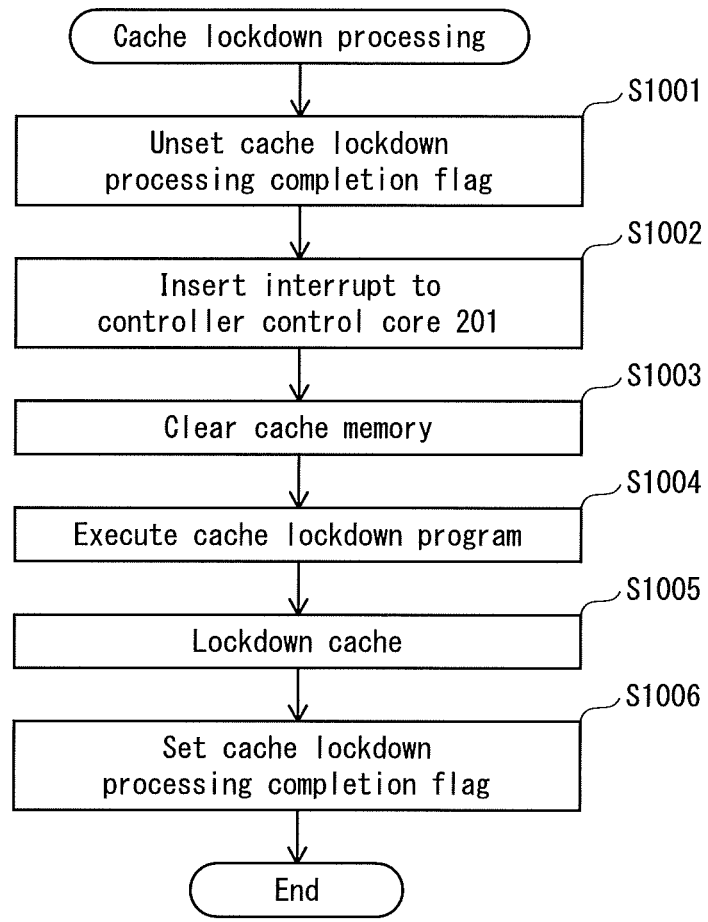
FIG. 10 is a flowchart showing cache lockdown processing according to mechanical control core 202 pertaining to a modification of the present invention.

FIG. 10 is a flowchart showing cache lockdown processing according to the mechanical control core 202. As shown in FIG. 10, the mechanical control core 202 unsets the cache lockdown processing completion flag (S1001) then interrupts the controller control core 201 (S1002). As a result, the controller control core 201 stops other processing and executes only the interrupt processing.

Figure 11:
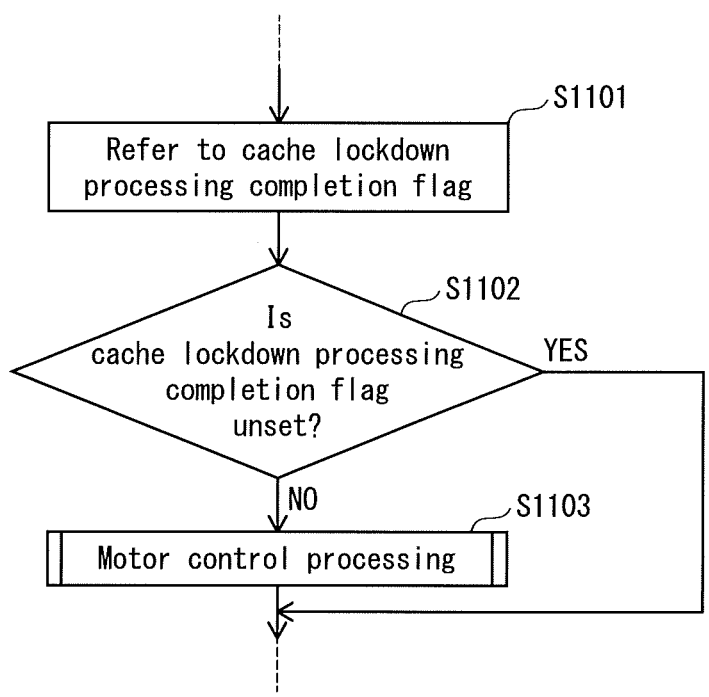
FIG. 11 is a flowchart illustrating a process pertaining to a modification of the present invention in which a cache lockdown program bypasses code such as motor control.

Next, the mechanical control core 202 clears the cache memory 203 (S1003) and the cache lockdown program (S1004). The cache lockdown program is a part of the image forming program other than motor control, sensor control, and timing processing. According to the present embodiment, as illustrated in FIG. 11, the cache lockdown processing completion flag is referenced prior to motor control, sensor control, and timing processing code in the image forming program (S1101).

If the cache lockdown processing completion flag is unset (S1102: YES), it is determined that cache lockdown processing is in progress, and therefore processing advances to subsequent code by bypassing code such as motor control. Further, if the cache lockdown processing completion flag is set (S1102: NO), code such as motor control is executed normally (S1103).

Upon completion of the cache lockdown program, the mechanical control core 202 locks down the cache (S1005), and sets the cache lockdown processing completion flag (S1006). Thus, the controller control core 201 exits the interrupt processing and returns to normal processing.

The effects of the present invention can also be obtained by the above configuration.

(4-2) According to an embodiment described above, an example is described in which the entirety of the cache memory 203 is locked down, but the present invention is of course not limited to this example, and alternatively a portion of the cache memory 203 may be locked down.

For example, in a case of the cache memory 203 being multi-way, in a state in which there is no writing to the cache memory 203 by the controller control core 201 in cache lockdown processing, first, an area other than a cache lockdown scheduled area in the cache memory 203 is locked down. This is to prevent the image forming program from being written to the area other than the cache lockdown scheduled area.

Next, the cache lockdown program is executed. Accordingly, the image forming program can be written to the cache lockdown scheduled area. Subsequently, the cache lockdown scheduled area is locked down and the cache lockdown of the area other than the cache lockdown scheduled area is canceled.

As long as a sufficiently large memory area is assigned as the cache lockdown scheduled area, the effects of the present invention can be obtained.

(4-3) According to an embodiment described above, an example of the CPU 200 is described as having two cores, but the present invention is of course not limited to this example and the following alternatives may be used.

Figure 12A:
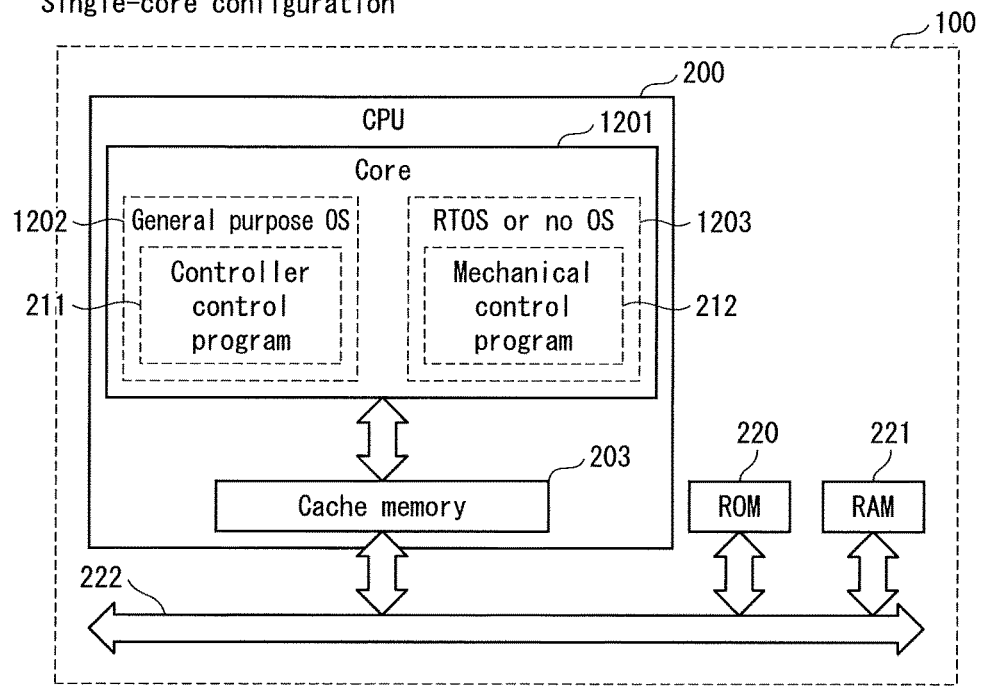
FIG. 12A illustrates a software configuration executed by a single core CPU configuration and FIG. 12B illustrates a software configuration executed by a double core CPU configuration.

For example, as shown in FIG. 12A, the CPU 200 may be a single-core configuration and only have a core 1201. In this case, the controller control program 211 may be executed on a general-purpose operating system (OS) 1202. Thus, it is possible to reduce work involved in developing the controller control program 211.

Further, the mechanical control program 212 may be executed on a real-time OS 1203, and may be executed without using an OS. Thus, real-time performance of mechanical control can be ensured.

Figure 12B:
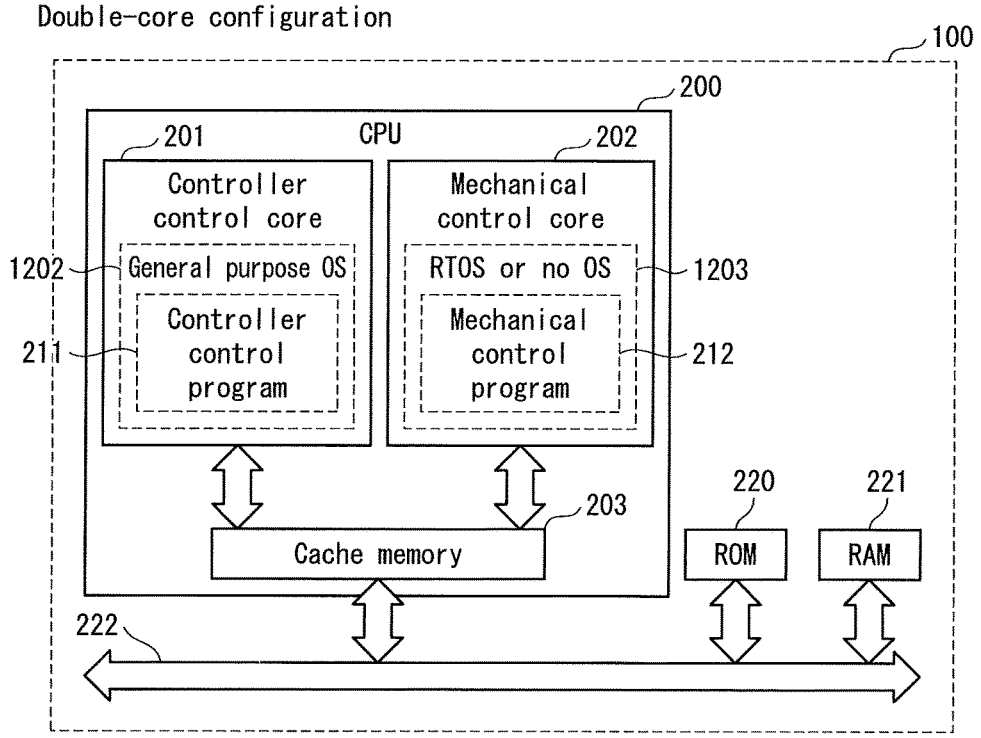

Further, as shown in FIG. 12B, even when the CPU 200 has the core 201 and the core 202 in a double-core configuration, a general purpose OS 1202 may be executed on the controller control core 201, and the controller control program 211 executed on the general purpose OS 1202. Further, a real-time OS 1203 may be executed on the mechanical control core 202 and the mechanical control program 212 executed on the real-time OS 1203. Further, an OS need not run on the mechanical control core 202 and the mechanical control program 212 may be run directly on the mechanical control core 202.

Further, the number of cores may be three or more, for example, in the case of a quad-core configuration including four cores, three cores may be used for controller control, and a remaining core used for mechanical control.

(4-4) According to an embodiment described above, an example is described in which motor control and the like are bypassed according to whether or not cache lockdown processing is being executed, as shown in FIG. 6, but the present invention is of course not limited to this example and the following alternatives may be used.

Figure 13:
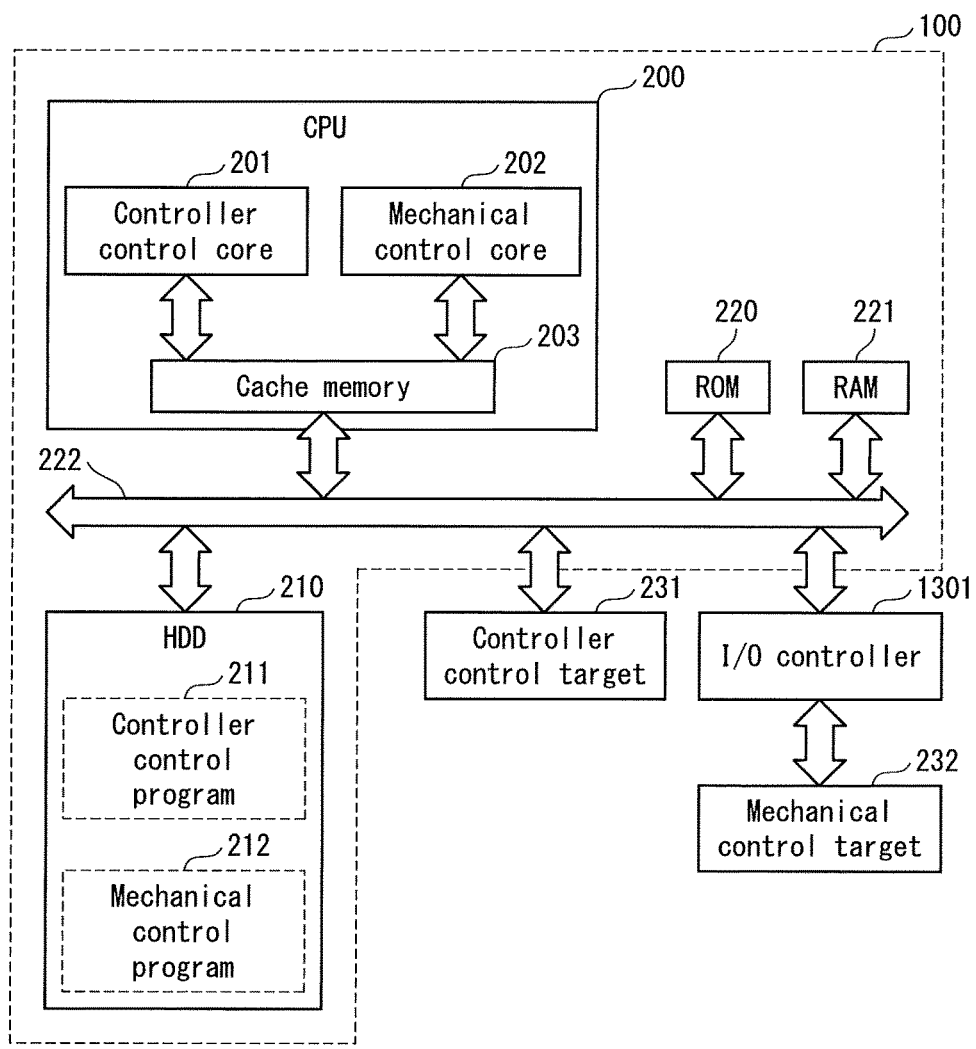
FIG. 13 shows configuration of controller 100 pertaining to a modification of the present invention.

For example, as shown in FIG. 13, an input and output (I/O) controller 1301 that controls access to the mechanical control target 232 may be used. The I/O controller 1301 includes internal memory (RAM).

I/O access from the mechanical control core 202 to the mechanical control target 232 is memory mapped I/O. Accordingly, by writing data to each address to which a register is mapped, output control is achieved, and sensor input can be obtained by reading data from each address to which a register is mapped.

The I/O controller 1301 operates according to instructions from the mechanical control core 202. When printing, the I/O controller 1301 causes the mechanical control core 202 to perform I/O access to the mechanical control target 232. Further, during cache lockdown processing, the I/O controller 1301 does not provide the mechanical control core 202 access to the mechanical control target 232 for image formation processing, but causes the mechanical control core 202 to access the I/O controller 1301 internal memory.

The I/O controller 1301, regarding access to the mechanical control target 232 during processing other than image formation processing, even during printing or cache lockdown processing, performs I/O access to the mechanical control target 232.

Thus, during cache lockdown processing, when the mechanical control core 202 performs control output for image formation processing, control content is written to the internal memory of the I/O controller 1301. Further, when the mechanical control core 202 acquires sensor input for image formation processing, content stored in the internal memory of the I/O controller 1301 is read out. Thus, input and output required for image formation processing are simulated without actual mechanical control.

During cache lockdown processing, it is desirable to write an appropriate sensor input value to the internal memory of the I/O controller 1301 either prior to execution of the image forming program or in accordance with execution of the image forming program. Further, the image forming program is executed in accordance with a print mode, and therefore it is preferable that the sensor input value to be written to the internal memory of the I/O controller 1301 is also a value in accordance with the print mode.

Further, in a case in which sensor input value varies according to control output value according to the image forming program, it is desirable to also refer to the control output value according to the image forming program in order to write the sensor input value to the internal memory of the I/O controller 1301. In this way, a simulation program that simulates sensor input should be executed prior to execution of the image forming program or in accordance with execution of the image forming program.

Switching of operation of the I/O controller 1301 may be performed by, for example, the mechanical control core 202. More specifically, during the cache lockdown processing, the I/O controller 1301 is switched to a cache lockdown processing operation mode prior to execution of the cache lockdown program. Further, the I/O controller 1301 may be switched to an image formation processing operation mode upon completion of execution of the cache lockdown program.

Thus, it is possible to perform cache lockdown processing by executing the image forming program as is, without adding code for operating as a cache lockdown program to the image forming program.

(4-5) According to an embodiment described above, an example is described in which the image forming device 1 is a tandem color printer, but the present invention is of course not limited to this example. The present invention may be applied to a color printer other than a tandem type, or to a monochrome printer. Further, the same effect can be obtained whether the present invention is applied to a short-function device such as a copier equipped with a scanner or a facsimile device that has a communication function or a multi-function peripheral (MFP) combining several such functions.

[5] Summary

According to image forming device that executes an image forming program for real-time mechanical control and another program, using a single cache memory for the image forming program and said another program, the image forming device comprising: a cache lockdown unit that executes a cache lockdown to lock down a storage area of the cache memory that stores at least a portion of the image forming program necessary for image formation processing; and a print unit that executes the image formation processing while the storage area is locked down, the storage area storing the portion of the image forming program necessary for the image formation process is locked down, and therefore memory access performed when executing the image forming program always results in a cache hit. Accordingly, delay in memory access for image formation processing is reliably prevented, and therefore real-time performance can be ensured.

The image forming device may further comprise: a simulated execution unit that, prior to the cache lockdown, executes the image formation processing while suppressing access to and timing control of a target of the mechanical control, causing storing of the portion of the image forming program necessary for image formation processing in the cache memory, wherein the cache lockdown unit executes the cache lockdown after completion of execution of the image formation processing by the simulated execution unit.

The image forming device may further comprise: a print preparation unit that, prior to the image formation processing, executes preparation processing required for the image formation processing, wherein the simulated execution unit executes the image formation processing during the preparation processing.

The image forming device may further comprise: a fixing unit that thermally fixes a toner image to a sheet at a time of the image formation processing, wherein the print preparation unit performs temperature control for the thermal fixing as the print preparation processing.

The image forming device may further comprise: a reception unit that receives a print instruction from a user, wherein upon reception of a print instruction, the print preparation unit executes the print preparation processing and the simulated execution unit executes the image formation processing.

The image forming device may further comprise: a suppression unit that suppresses use of the cache memory by at least a portion of said another program while the simulated execution unit executes the image formation processing and the cache lockdown unit executes the cache lockdown.

The image forming device may further comprise: an interruption unit that interrupts execution of at least a portion of said another program while the simulated execution unit executes the image formation processing and the cache lockdown unit executes the cache lockdown.

The image forming device may further comprise: a write unit that, prior to the cache lockdown, executes image formation processing of a first page among pages to be printed, causing at least a portion of the image forming program to be stored in the cache memory, wherein the cache lockdown unit executes the cache lockdown after completion of the image formation processing of the first page by the write unit.

The image forming device may further comprise: a suppression unit that suppresses use of the cache memory by at least a portion of said another program while the print unit executes the image formation processing of the first page and the cache lockdown unit executes the cache lockdown.

The image forming device may comprise: an interruption unit that interrupts execution of at least a portion of said another program while the print unit executes the image formation processing of the first page and the cache lockdown unit executes the cache lockdown.

The image forming device may be configured so that the suppression unit cancels the suppression after the execution of the cache lockdown.

The image forming device may be configured so that the interruption unit cancels the interruption after the execution of the cache lockdown.

The image forming device may further comprise: a cancel unit that cancels the cache lockdown after completion of the image formation processing during the cache lockdown.

The image forming device may further comprise: a jam detection unit that detects a jam during execution of the image formation processing by the print unit during the cache lockdown; and a jam detection-linked cancel unit that cancels the cache lockdown upon detection of the jam.

The image forming device may further comprise: a recovery detection unit that detects recovery from the jam; and a cache re-lockdown unit that, upon detection of recovery from the jam, executes a cache lockdown to lockdown the storage area of the cache memory.

The image forming device may be configured so that the image forming program is executed on a real-time operating system (OS) or without an OS, and a portion of said another program that does not require real-time performance is executed on a general-purpose OS.

The image forming device may further comprise: a single-core central processing unit (CPU), wherein the image forming program and said another program are executed on the single-core CPU.

The image forming device may further comprise: a multi-core CPU, wherein the image forming program and said another program are executed on different cores of the multi-core CPU.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. An image forming device that executes an image forming program for real-time mechanical control and an other program different from the image forming program, using a same cache memory for the image forming program and said other program, the image forming device comprising:

a cache lockdown unit that executes a cache lockdown to lock down a storage area of the cache memory that stores a portion of the image forming program necessary for image formation processing that forms an image by causing operation of a mechanical part via the mechanical control; and a print unit that executes the image formation processing while the storage area is locked down and an other area of the cache memory that stores a portion of the other program necessary for the other program's processing Is not in cache lockdown.

2. The image forming device of claim 1, further comprising:

a simulated execution unit that, prior to the cache lockdown, executes the image formation processing while suppressing access to and timing control of a target of the mechanical control, causing storing of the portion of the image forming program necessary for image formation processing in the cache memory, wherein the cache lockdown unit executes the cache lockdown after completion of execution of the image formation processing by the simulated execution unit.

3. The image forming device of claim 2, further comprising:

a print preparation unit that, prior to the image formation processing, executes preparation processing required for the image formation processing, wherein the simulated execution unit executes the image formation processing during the preparation processing.

4. The image forming device of claim 2, further comprising:

a suppression unit that suppresses use of the cache memory by at least a portion of said other program while the simulated execution unit executes the image formation processing and the cache lockdown unit executes the cache lockdown.

5. The image forming device of claim 2, further comprising:

an interruption unit that interrupts execution of at least a portion of said other program while the simulated execution unit executes the image formation processing and the cache lockdown unit executes the cache lockdown.

6. The image forming device of claim 3, further comprising:

a fixing unit that thermally fixes a toner image to a sheet at a time of the image formation processing, wherein the print preparation unit performs temperature control for the thermal fixing as the print preparation processing.

7. The image forming device of claim 3, further comprising:

a reception unit that receives a print instruction from a user, wherein upon reception of a print instruction, the print preparation unit executes the print preparation processing and the simulated execution unit executes the image formation processing.

8. The image forming device of claim 4, wherein
the suppression unit cancels the suppression after the execution of the cache lockdown.

9. The image forming device of claim 7, wherein
the interruption unit cancels the interruption after the execution of the cache lockdown.

10. The image forming device of claim 1, further comprising:

a write unit that, prior to the cache lockdown, executes image formation processing of a first page among pages to be printed, causing at least a portion of the image forming program to be stored in the cache memory, wherein the cache lockdown unit executes the cache lockdown after completion of the image formation processing of the first page by the write unit.

11. The image forming device of claim 10, further comprising:

a suppression unit that suppresses use of the cache memory by at least a portion of said other program while the print unit executes the image formation processing of the first page and the cache lockdown unit executes the cache lockdown.

12. The image forming device of claim 10, further comprising:

an interruption unit that interrupts execution of at least a portion of said other program while the print unit executes the image formation processing of the first page and the cache lockdown unit executes the cache lockdown.

13. The image forming device of claim 11, wherein
the suppression unit cancels the suppression after the execution of the cache lockdown.

14. The image forming device of claim 12, wherein
the interruption unit cancels the interruption after the execution of the cache lockdown.

15. The image forming device of claim 1, further comprising:

a cancel unit that cancels the cache lockdown after completion of the image formation processing during the cache lockdown.

16. The image forming device of claim 1, further comprising:

a jam detection unit that detects a jam during execution of the image formation processing by the print unit during the cache lockdown; and a jam detection-linked cancel unit that cancels the cache lockdown upon detection of the jam.

17. The image forming device of claim 16, further comprising:

a recovery detection unit that detects recovery from the jam; and a cache re-lockdown unit that, upon detection of recovery from the jam, executes a cache lockdown to lockdown the storage area of the cache memory.

18. The image forming device of claim 1, wherein
the image forming program is executed on a real-time operating system (OS) or without an OS, and a portion of said other program that does not require real-time performance is executed on a general-purpose OS.

19. The image forming device of claim 18, further comprising:

a single-core central processing unit (CPU), wherein
the image forming program and said other program are executed on the single-core CPU.

20. The image forming device of claim 18, further comprising:

a multi-core CPU, wherein
the image forming program and said other program are executed on different cores of the multi-core CPU.

* * * * *